I. B. WERNER.
Improvement in Curtain-Fixtures.

No. 131,643. Patented Sep. 24, 1872.

Witnesses:
A. Bennerendorf
C. Sedgwick

Inventor:
I. B. Werner
PER Munn & Co
Attorneys.

UNITED STATES PATENT OFFICE.

ISAAC B. WERNER, OF ROSSVILLE, ILLINOIS.

IMPROVEMENT IN CURTAIN-FIXTURES.

Specification forming part of Letters Patent No. 131,643, dated September 24, 1872.

*To all whom it may concern:*

Figure 1:
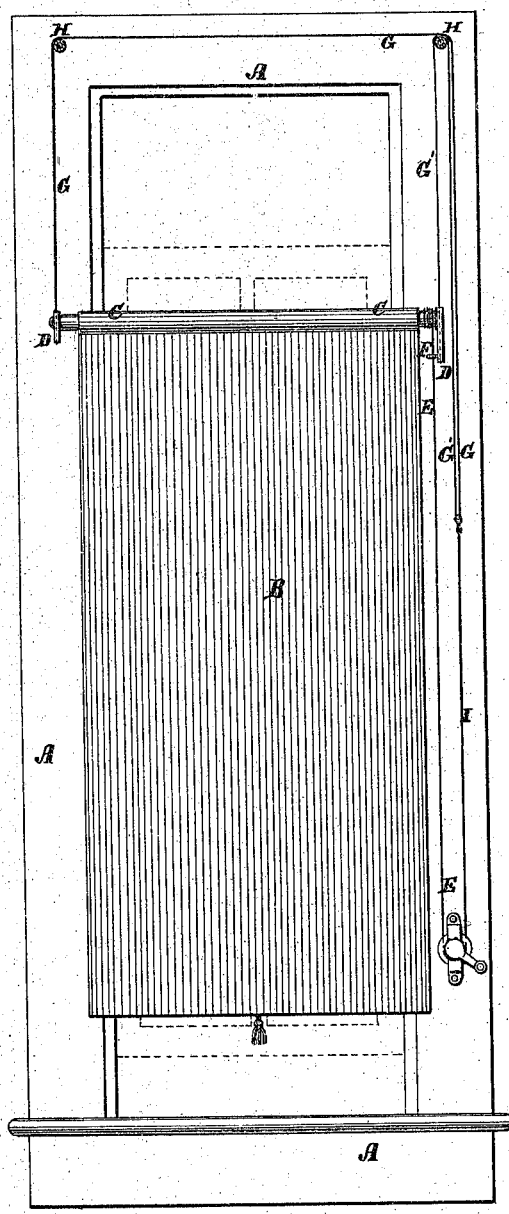
Figure 2:
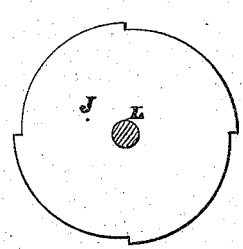
Figure 3:
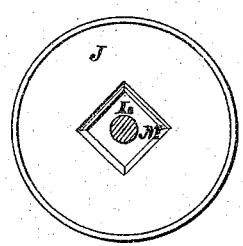
Figure 4:
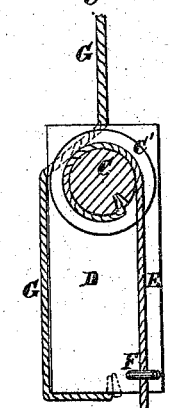
Figure 5:
Figure 6:
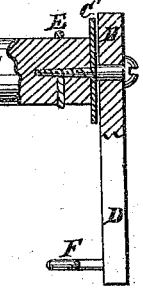
Figure 7:
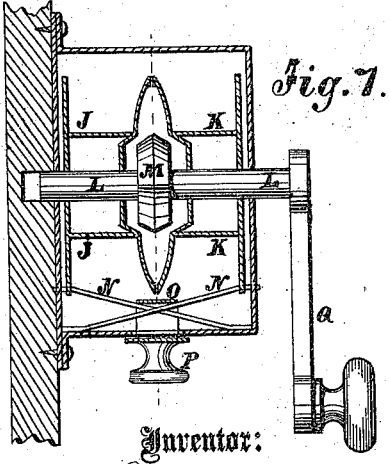

Be it known that I, ISAAC B. WERNER, of Rossville, in the county of Vermilion and State of Illinois, have invented a new and useful Improvement in Window-Shade Fixtures, of which the following is a specification:

Figure 1 represents my improved fixtures as applied to a window. Fig. 2 represents the outer flange of one of the reel-pulleys. Fig. 3 represents the inner flange and the clutch of the same. Fig. 4 represents the manner in which the cords are attached to the shade-roller and block. Fig. 5 represents the slip-knot of the cords. Fig. 6 represents the manner in which the shade-roller and blocks are connected together. Fig. 7 is a detail sectional view of the reel.

Similar letters of reference indicate corresponding parts.

My invention has for its object to furnish an improved apparatus, simple in construction, convenient in use, and effective in operation, for rolling up a window-shade and lowering it from the top of a window; and it consists in the construction and combination of various parts of the fixtures, as hereinafter more fully described.

A represents the window-casing. B represents the shade, the upper end of which is attached to a roller, C, in the ordinary manner. The ends of the roller C are pivoted to blocks D, of wood, metal, or other suitable material, a washer, $c'$, being interposed between the end of the roller and the block at that end of the roller C to which the winding or rolling cord E is attached. The cord E passes down through a guide-eye, F, attached to the block D, and its lower end is connected with a knob, cleat, or pulley in the ordinary manner, or with the reel hereinafter described. G G' is a cord, the ends of which are attached to the lower ends of the blocks D, pass up along the inner sides, and are connected with the upper ends of said blocks, as shown in Fig. 4, so as to serve as fenders or cushions to prevent the blocks, in their up-and-down movement, from rubbing or marring the paint upon the window-casing. The cords G G' pass over knobs or pulleys H, made of any suitable material, attached to the corners of the casing, one of the cords, as G, passing across the top of the casing, as shown in Fig. 1. The cords G G' pass down together along one side of the casing A, and are connected with a single cord, I, by a slip-knot or its equivalent, as shown in Fig. 5. This allows the cords G G' to be evened to support the shade horizontally should one stretch more than the other, which it is liable to do, as the cord G' has more weight to support than the cord G. The cord I extends down along the side of the window-casing and is attached to the reel hereinafter described. J K are two spools or reels, made of metal, wood, or any suitable material, to which the ends of the cords E I are attached, and which are placed end to end upon a short shaft, L, which works in supports attached to the lower part of the casing A. The outer flanges of the spools J K have notches or ratchet-teeth formed in them, as shown in Fig. 2, to receive spring-catches for holding them in place. The inner or adjacent end flanges of the spools J K are inclined toward each other, so that their outer edges may touch or nearly touch while leaving space between said ends for the clutch M to revolve. The clutch M is made square and with beveled edges, and is rigidly attached to the shaft L. In the adjacent ends of the spools J K are formed square recesses having beveled sides to receive the clutch M, so that by moving the shaft L longitudinally the clutch M may be thrown into gear with either of said spools, so as to revolve it, while the other spool stands still. By moving the clutch M midway between the ends of the spools J K both of said spools will be allowed to turn freely upon the shaft L. N are two diagonal spring-bars, the outer ends of which are secured to the case that supports the reel, and the inner ends of which rest upon the outer or ratchet flanges of the spools J K, so as to hold said spools securely in place. With the middle part of the spring-bars N is connected a slide, O, which is attached to the shank of a knob, P, that passes through a slot in the bar or case that supports the reel, so that by moving the slide O in one or the other direction one or the other of the spring-bars N will be raised from its spool, allowing said spool to run back. When the slide O is in the middle of the spring-bars N both of said spools will be held. To the outer end of the shaft L is attached a crank, Q, for convenience in operating it. By this construction the shade can be lowered from the upper part of the window, or rolled or unrolled, as may be desired.

Having thus described my invention, I claim as new and desire to secure by Letters Patent—

The spools J K, shaft L, clutch M, spring-bars N, and slide O, constructed and arranged to operate in connection with each other and the cords E I, substantially as herein shown and described, and for the purposes set forth.

I. B. WERNER.

Witnesses:
    FREDRECK MAKENTHUM,
    JAMES CORNELL.